UNITED STATES PATENT OFFICE.

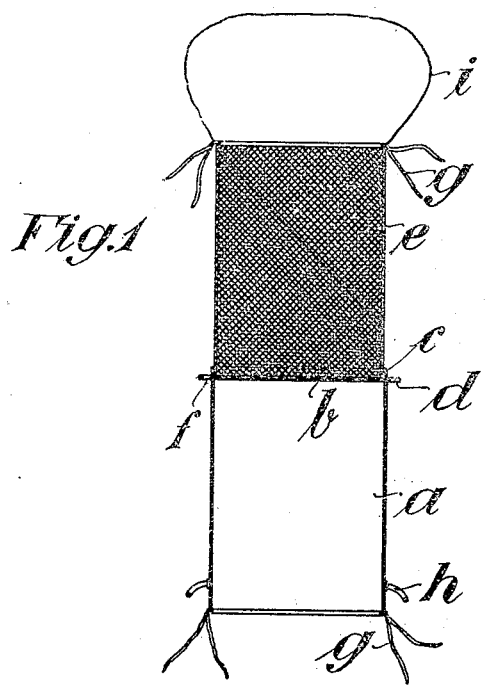
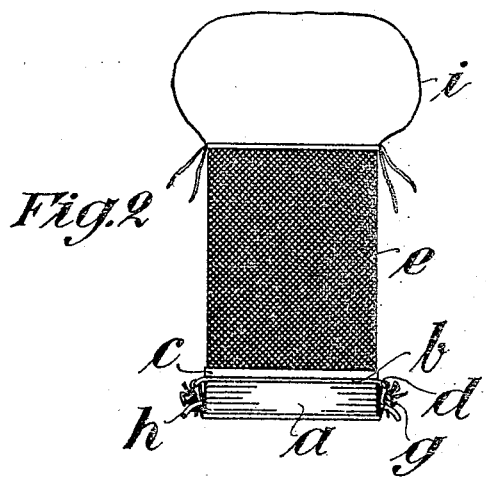

HERMANN ZWIEGER, OF DRESDEN-BLASEWITZ, GERMANY.

NOSE-BAG.

951,356.  Specification of Letters Patent.  Patented Mar. 8, 1910.

Application filed June 8, 1909. Serial No. 500,973.

*To all whom it may concern:*

Be it known that I, HERMANN ZWIEGER, a subject of the King of Saxony, and resident of Dresden - Blasewitz, Saxony, Germany, have invented certain new and useful Improvements in Nose-Bags, of which the following is a specification.

This invention relates to a nose-bag combined with a device for watering horses and other animals.

The improved nose-bag which provides for both feeding and watering the animals is very useful particularly for the army as it permits great reduction of the baggage.

In the accompanying drawings the improved nose-bag is shown in Figure 1 in vertical section, both parts being extended. Fig. 2 represents the improved nose-bag in view, the watering device being shown in its folded up position.

The improved nose-bag is composed of a watering bag $a$ which is made of impermeable material, such as india-rubber tissue, sailcloth or the like and fixed upon a plate $b$ which forms the bottom for both parts of the device. The bottom plate $b$ has an annular ridge upon its surface which is turned away from the watering bag, said ridge $c$ being made in one piece with and of the same material as the bottom plate. The nose-bag proper $e$ is fixed upon said annular ridge $c$ in any suitable manner, the nose-bag being made of collapsible network or of a material which permits the free access of the air to the food contained in said bag. The bag $e$ can be attached to ridge $c$ by sewing or in any other suitable manner.

The edge $d$ of the bottom-plate $b$ laterally projects over said annular ridge $c$ and has eyes $f$ destined to receive the ribbons or cords $g$ by means of which the nose-bag and the watering bag, when folded up, are to be tied down to the bottom plate. The watering bag further has handles $h$ by means of which it is held when being in use. The nose bag proper $e$ has as usual a cord $i$ by means of which it is suspended around the neck of the animal. The nose-bag further offers the advantage that the food does not get warm.

I claim:—

An improved nose - bag for horses and other animals comprising a nose-bag proper made of network or material which permits the free access of the air to the food contained in said bag, a bottom plate, an annular ridge upon one surface of said bottom plate on which the nose bag proper is fixed, a lateral edge of said bottom plate having eyes, a watering bag of impermeable material fixed upon the bottom plate at the side opposite to the nose bag, ribbons at the upper ends of the nose bag and of the watering bag destined to attach the folded up bags to the eyes of the rim of the bottom plate and finally the handles of the watering bag, substantially as described and shown and for the purpose set forth.

In witness whereof I have hereunto set my hand in the presence of two witnesses.

HERMANN ZWIEGER.

Witnesses:
 PAUL ARRAS,
 CLÄRE SIMON.